United States Patent
Zagajac et al.

(10) Patent No.: US 11,170,640 B2
(45) Date of Patent: Nov. 9, 2021

(54) METHOD AND APPARATUS FOR BRIDGING AND OPTIMIZING V2X NETWORKS

(71) Applicant: Ford Global Technologies, LLC, Dearborn, MI (US)

(72) Inventors: Jovan Milivoje Zagajac, Ann Arbor, MI (US); Ivan Vukovic, Birmingham, MI (US); Sushanta Das, Canton, MI (US); Krishna Bandi, Farmington Hills, MI (US); Brennan Hamilton, Birmingham, MI (US); Thomas E. Apczynski, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 260 days.

(21) Appl. No.: 16/411,984

(22) Filed: May 14, 2019

(65) Prior Publication Data

US 2020/0365012 A1 Nov. 19, 2020

(51) Int. Cl.
*H04W 92/02* (2009.01)
*G08G 1/01* (2006.01)
*H04W 4/44* (2018.01)

(52) U.S. Cl.
CPC ......... *G08G 1/0141* (2013.01); *G08G 1/0112* (2013.01); *H04W 4/44* (2018.02); *H04W 92/02* (2013.01)

(58) Field of Classification Search
CPC ....... H04W 4/027; H04W 4/029; H04W 4/12; H04W 4/40; H04W 4/42; H04W 4/44;
(Continued)

(56) References Cited

U.S. PATENT DOCUMENTS 9,786,178 B1 * 10/2017 Bai .................. B60Q 5/006
10,231,187 B1 * 3/2019 Rubin .................. H04W 4/46
(Continued)

FOREIGN PATENT DOCUMENTS

WO 2014198325 A1 12/2014

OTHER PUBLICATIONS

V2X Cellular Solutions, 5G Americas, Oct. 2016, pp. 1-37.
Connected Vehicle Roadside Unit, TPI Traffic Products, www.trafficproducts.net, 2 pgs.

*Primary Examiner* — Jean A Gelin
(74) *Attorney, Agent, or Firm* — Gregory P. Brown; Brooks Kushman P.C.

(57) ABSTRACT

A road-side unit includes a first transceiver configured to communicate using a first vehicle-to-infrastructure protocol and a second transceiver configured to communicate using a second vehicle-to-infrastructure protocol, the first vehicle-to-infrastructure protocol and the second vehicle-to-infrastructure protocol being incompatible with one another. The road-side unit further includes a processor programmed to monitor transmissions from the first and second transceivers, receive an incoming message sent to the processor from the first transceiver, the incoming message being designated for distribution to roadway participants, identify based on the monitored transmissions whether the second transceiver is in communication with devices of roadway participants available to receive outgoing messages, and if so, construct an outgoing message based on the incoming message and send the outgoing message via the second transceiver.

16 Claims, 10 Drawing Sheets

(58) Field of Classification Search
CPC ........... H04W 4/46; H04W 4/48; H04W 4/80; H04W 24/08; H04W 92/02; H04W 92/04; H04W 92/16; G08G 1/0112; G08G 1/0141

See application file for complete search history.

(56) References Cited

U.S. PATENT DOCUMENTS

| | | | |
|---|---|---|---|
| 2015/0091740 A1* | 4/2015 | Bai | B60Q 9/008 340/901 |
| 2016/0295624 A1* | 10/2016 | Novlan | H04W 72/04 |
| 2017/0134080 A1* | 5/2017 | Rahman | H04B 7/0456 |
| 2017/0299689 A1* | 10/2017 | Va | G01S 1/68 |
| 2017/0369062 A1* | 12/2017 | Saigusa | B60W 30/16 |
| 2018/0234913 A1 | 8/2018 | Kahtava et al. | |
| 2019/0279508 A1* | 9/2019 | Wang | G01S 19/42 |
| 2020/0037131 A1* | 1/2020 | Hieu Nguyen | H04B 7/0617 |
| 2020/0077237 A1* | 3/2020 | Upadhya | G08G 1/07 |
| 2020/0096597 A1* | 3/2020 | Kobayashi | G05D 1/0088 |
| 2020/0120458 A1* | 4/2020 | Aldana | H04W 36/08 |
| 2020/0137580 A1* | 4/2020 | Yang | H04W 12/06 |
| 2020/0193811 A1* | 6/2020 | Zagajac | H04W 4/46 |
| 2020/0207347 A1* | 7/2020 | Ito | G08G 1/165 |
| 2020/0229206 A1* | 7/2020 | Badic | H04W 40/24 |
| 2020/0282981 A1* | 9/2020 | Wang | H04W 4/40 |
| 2020/0342760 A1* | 10/2020 | Vassilovski | G05D 1/0221 |
| 2020/0382922 A1* | 12/2020 | Park | H04L 69/22 |

\* cited by examiner

METHOD AND APPARATUS FOR BRIDGING AND OPTIMIZING V2X NETWORKS

TECHNICAL FIELD

Aspects of the disclosure generally relate to bridging and optimizing vehicle-to-everything (V2X) networks.

BACKGROUND

Road-side units, or RSUs, provide wireless communications from roadside infrastructure to vehicle on-board units, or OBUs. Such communication may be referred to as I2V communication. RSUs generally operate in the same frequency band as the Vehicle-to-Everything technology operates. These technologies include Cellular Vehicle-to-Everything (CV2X) and Dedicated Short Range Communications (DSRC) technologies as some examples. Some RSUs provide additional functionality, such as local Wi-Fi hotspots for pedestrians or cellular backhaul to communicate information with a central system.

SUMMARY

In one or more illustrative examples, a road-side unit includes a first transceiver configured to communicate using a first vehicle-to-infrastructure protocol and a second transceiver configured to communicate using a second vehicle-to-infrastructure protocol, the first vehicle-to-infrastructure protocol and the second vehicle-to-infrastructure protocol being incompatible with one another. The road-side unit further includes a processor programmed to monitor transmissions from the first and second transceivers, receive an incoming message sent to the processor from the first transceiver, the incoming message being designated for distribution to roadway participants, identify based on the monitored transmissions whether the second transceiver is in communication with devices of roadway participants available to receive outgoing messages, and if so, construct an outgoing message based on the incoming message and send the outgoing message via the second transceiver.

In one or more illustrative examples, a method includes responsive to receipt of a first incoming message indicating a status of a first roadway participant to a first of a plurality of transceivers of a road-side unit, identifying a priority of providing information to other roadway participants about the first roadway participant according to the status; receiving a second incoming message to a second of the plurality of transceivers; and prioritizing sending a first outgoing message including information indicating the status of the first roadway participant over other messages affiliated with lower priority statuses at least until the status of the first roadway participant changes.

In one or more illustrative examples, a non-transitory computer readable medium comprising instructions that, when executed by a processor of a road-side unit, cause the road-side unit to, responsive to receipt of a first incoming message indicating a status of a first roadway participant to a first of a plurality of transceivers of a road-side unit, identifying a priority of providing information to other roadway participants about the first roadway participant according to the status; receive a second incoming message to a second of the plurality of transceivers; and prioritize sending a first outgoing message including information indicating the status of the first roadway participant as compared to other messages according to the priority.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicle-to-everything (V2X) communication includes various types of communications, including vehicle-to-vehicle (V2V), vehicle-to-infrastructure (V2I), vehicle-to-person (V2P), and vehicle-to-network (V2N). These multi-faceted communication aspects may be delivered by a wide range of wireless communication technologies, such as: Wi-Fi, Bluetooth, DSRC. CV2X (e.g., PC5, although other options are contemplated), LTE, Ultra-Wide Band, and Long Range (Low Power) Communication. If these standalone distinct technologies could leverage input from each other and act in interoperable manner, it would benefit intelligent transportation system (ITS) applications. For example, if a pedestrian's BLUETOOTH-enabled smartphone could communicate with the road users (e.g., vehicles, pedestrians, etc.), then that communication may be used to enhance the routing of vehicles along the roadway.

However, wireless technologies in most cases are not designed to be interoperable. For instance, CV2X and DSRC use the ITS (Intelligent Transportation Systems) protocols, WAVE (Wireless Access in Vehicular Environments) uses various different standards provided by the IEEE, 3GPP, and SAE; Bluetooth uses the Bluetooth SIG (Special Interest Group) Standards. LoRa uses the LoRaWAN (Long Range Low Power Wide Area Networks) standards; and UWB uses the Ultra-Wide Band Standards. Directly addressing the interoperability of wireless standards for ITS applications is not feasible.

In this disclosure, an efficient method and apparatus to Bridge ITS networks supported by distinct wireless technologies is described, which may be used to leverage input from various protocols and technologies to enhance ITS applications.

Figure 1:
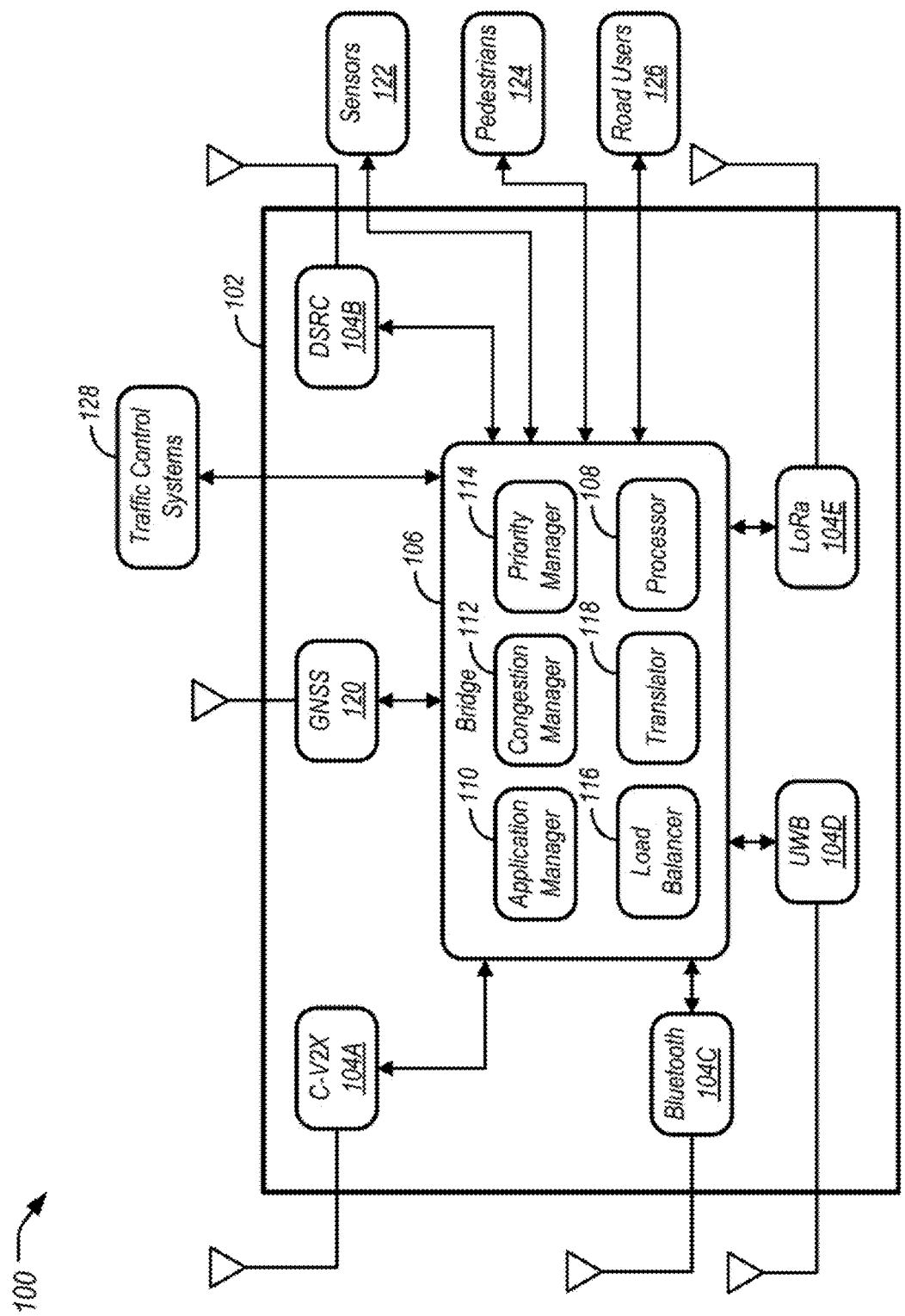
FIG. 1 illustrates a system including an RSU with an embedded bridge.

FIG. 1 illustrates a system 100 including a Road Side Unit (RSU) 102 with an embedded bridge 106. The RSU 102 is generally a transceiver that may be mounted along a road for traversal by road users 126 or along a passageway for pedestrians 124. When in operation, the RSU 102 broadcasts data or exchanges data with vehicles, other roadway users 126, or other networked devices within a communications zone surrounding the RSU 102. The RSU 102 may also provide for channel assignment and operating instructions to devices within the communications zone.

As shown the RSU 102 includes a plurality of radio transceivers 104. These radio transceivers 104 may include physical radio units and/or software-defined radio units. In the illustrated example, the RSU 102 includes a C-V2X radio 104A (e.g., PC5), a DSRC radio 104B, a BLUETOOTH radio 104C, an ultra-wide band (UWB) radio 104D, and a long-range low-power radio (LoRa) 104E. It should be noted that the illustrated radio transceivers 104 of the RSU 102 is only an example, and more, fewer, or different radios (e.g., Wi-Fi) may be included in the RSU 102. It should also be noted that in some examples, multiply technologies may be supported by a single radio 104, such as both Wi-Fi and DSRC may be implemented using a single radio 104.

The bridge 106 may be configured to provide for simultaneous radio frequency (RF) transmission and reception of messages in multiple wireless technologies via the radio transceivers 104. The bridge 106 may include various types of computing apparatus in support of performance of the functions of the bridge 106 described herein. In an example, the bridge 106 may include one or more processors 108 configured to execute computer instructions of various components, such as of an application manager 110, a congestion manager 112, a priority manager 114, a load balancer 116, and a translator 118. In some cases, the processor 108 may be referred to as an edge computer, as the processor 108 may perform computations for devices at the edge of the network. The bridge 106 may further include a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, the processor 108 receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C #, FORTRAN, PASCAL, VISUAL BASIC, PYTHON, JAVA SCRIPT, PERL, PL/SQL, etc.

The application manager 110 be programmed to classify roadway participants utilizing applications installed to their mobile devices (e.g., bicycles, pedestrians, scooters, etc.), determine threat levels of the classified participants (e.g., how important it is to inform other roadway participants of the classified participant), and assign priorities to the participants according to the threat levels. The priorities may be used to determine what messages should be provided to the roadway participants. The application manager 110 may be programmed to allow the bridge 106 to interface with information received from mobile devices of pedestrians 124. In an example, the application manager 110 may receive information such as pedestrian 124 location and/or whether a pedestrian 124 is handicap from one or more pedestrians at that respective intersections. The application manager 110 may further utilize this location information of the multiple pedestrians to determine if any/all of those pedestrians 124 may be a threat to any other traffic participants that may be reached via the radio transceivers 104 of the RSU 102. Based on the target classification, the application manager 110 may determine a threat level. The application manager 110 may also assign a priority and provides necessary information to other components of the RSU 102 to construct outgoing messages for the respective wireless networks for use by other traffic participants. For instance, if a pedestrian is identified as from a message sent by a mobile device of the pedestrian as being close to the roadway, then a message indicating the location of that pedestrian may be immediately broadcast using the transceivers 104. However, if the pedestrian is identified by the message as not being close to the roadway, then a message indicating the location of that pedestrian may be sent later or after other messages that are of higher priority.

The congestion manager 112 may be programmed to identify congestion scenarios on each of the wireless networks that the bridge 106 can access via the radio transceivers 104. The congestion manager 112 may also be programmed to perform operations to mitigate congestion at the radio transceiver 104 level for efficient communication between the different wireless networks. For instance, the congestion manager 112 may direct a radio transceiver 104 that is congested to perform operations to mitigate the congestion. These operations may include, for example, to adjust the channels being used, to change the frequency being used, to adjust the transmit power for outgoing message, to adjust the probability in determining the necessary message frequency rate for outgoing messages.

The priority manager 114 may be programmed to manage priority of messages that are processed by the bridge 106. In an example, some messages being processed by the bridge 106 may be more important to report that others. For instance, if fifty pedestrians 124 are waiting to cross a road, then the priority manager 114 may send out a single message indicating that fifty pedestrians 124 are waiting (or in other cases choose one message from one pedestrian 124 to process) based on the priority level received by the priority manager 114 from the application manager 110. In another example, the priority manager 114 may be programmed to receive CV2X messages that occur at one tenth of a second intervals, but only process those messages that include new priority information compared to the previous message such that the outgoing messages are being prioritized correctly.

The load balancer 116 may be programmed to manage load across the different networks that the bridge 106 can access using the radio transceivers 104. For example, if Wi-Fi is congested, then the load balancer 116 may be programmed to optimize to send messages over a different radio transceiver 104, provided that the intended recipients can receive using that different radio transceiver 104. In some examples, the bridge 106 may query roadway users 126 or other message recipients to determine what communications protocols are supported by the devices. Additionally, or alternately, the bridge 106 may maintain a mapping of default protocols supported by various categories of device, e.g., that DSRC and C-V2X are supported by roadway users 126, that BLUETOOTH and Wi-Fi are supported by mobile phones, and so on. As another possibility, devices that connect to the RSU 102 may be configured to select one of the transceivers 104 to use based on desired Key-Performance Indicators (KPI). For example, the same information may be encoded and transmitted via BLUETOOTH, WiFi, Cellular, LoRa or other wireless interfaces. While each protocol has its own merits and demerits, the connecting device may be configured to choose, in instances where the device is configured to communicate with multiple transceivers 104 of the RSU 102, to select the transceiver 104 to use in terms of desired Quality of Service (e.g., latency, data rate requirement etc. based on available networks and balancing the network load, etc.).

The translator 118 may be programmed to perform translation of messages from one protocol to another. This may be done to allow messages to and from the different distinct wireless technologies supported by the transceivers 104 to be translated such that the translated information for the different distinct wireless technologies allows the devices connected to different transceivers 104 of the RSU 102 to be interoperable. In an example, the translator 118 may allow a message to be received from a sender using one of the radio transceivers 104 (e.g., CV2X), and be translated along to a recipient using a different one of the radio transceivers 104 (e.g., via DSRC). The translator 118 may take into consideration translating of messages between the wireless networks at the network layer level, as per the open system interconnection model, or OSI model.

Notably, due to differences in the protocols supported by the different radio transceivers 104, the translator 118 may be required to more than simply translate a message in a first protocol to a message in a second protocol. For instance, in some cases a protocol may include simple ping messages from a device, while, in another protocol, more detailed messages with current location and other information may be required. Accordingly, in such cases the translator 118 may create packets that include additional information in conformance with the requirements of the protocol being translated to.

The global navigation satellite system (GNSS) 120 controller may be configured to allow the RSU 102 to determine information indicative of the location of the RSU 102. In an example, the GNSS 120 may utilize one or more of GPS, GLONASS, Galileo or BeiDou systems to provide a fix in location for the RSU 102.

The sensors 122 may include cameras or other technologies configured to sense roadway users 126, pedestrians 124, roadside objects, or other obstacles that lack in wireless connectivity. In an example, the sensors 122 may include a camera or cameras that provide still images or video that may be analyzed using image recognition algorithms to identity the roadway users 126, pedestrians 124, roadside objects, or other obstacles. The sensors 122 may accordingly be used to provide information about non-wireless-enabled participants in the roadway that may be useful for the bridge 106 in understanding their locations. For instance, the sensors 122 may sense a pedestrian 124 or a roadway user 126 and may operate as a stand-in for the pedestrian 124 or roadway user 126 in determining whether it is safe for a wireless-enabled participant to traverse the roadway, or simply to advise the wireless-enabled participant of the existence of the non-wireless-enabled participant.

The RSU 102 may be configured to monitor the mobility, congestion patterns, and network load on each radio interface in the background, receive messages as input over one or more technologies, and process each of the received messages in order to classify the target devices by location and priority level. This classification of the devices includes analyzing the information received via the transceivers 104 over the different wireless networks from the different devices, performing a threat analysis on the received messages, determining the threat levels between the respective targets of the respective wireless technologies, and providing the classification information for the outgoing message to avoid any collision impacts (or) to help in providing the information for efficient management of the network load.

Based on the classification, priority level, and monitoring status from each of the interfaces, the RSU 102 may determine which output interface the messages or a subset of the message will be transmitted on. Accordingly, the RSU 102 may, for each of the selected output interfaces for transmission, translate the message or the message subset to the appropriate format for this particular output interface.

Figure 2:
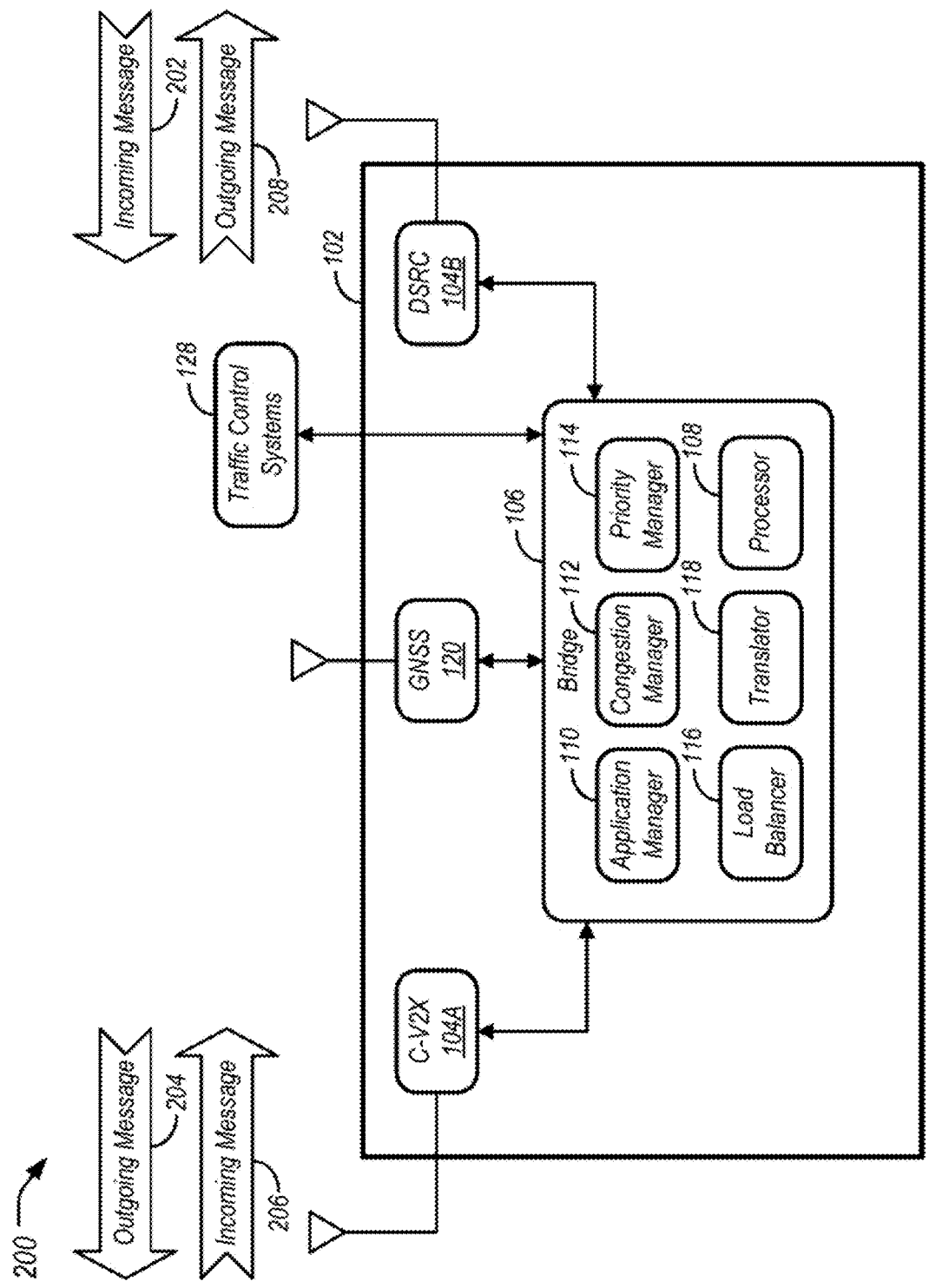
FIG. 2 illustrates an example of the RSU bridging two radio interfaces.

FIG. 2 illustrates an example 200 of the RSU 102 bridging two radio interfaces. For example, the radio interfaces may include a C-V2X radio 104A (e.g., PC5) and a DSRC radio 104B. An input message 202 may be received by the bridge 106 of the RSU 102 over one input radio interface, (e.g., the DSRC radio 104B) as shown in the example 200. Responsive to receipt of the input message 202, the bridge 106 of the RSU 102 may send an output message 204. It should be noted that the bridge 106 may communicate using unicast, multi-cast, and/or broadcast communication modes.

As discussed above, the bridge 106 monitors the mobility, congestion pattern status and network load on both DSRC and C-V2X (PC5) radio 104 interfaces. Responsive to receipt of the incoming message 202 to the DSRC radio 104B, the bridge 106 decodes the incoming message 202 to classify the target and the priority levels. According to this classification, the bridge 106 may assign a priority at the CV2X (PC5) radio 104A interface and may translate the V2X message into a format acceptable for CV2X (PC5) communication. The bridge 106 may then transmit the translated message as an output message 204 over C-V2X (PC5) radio 104A interface. A reverse approach may be performed if the message was received on the CV2X (PC5) radio 104A interface to be output via the DSRC radio 104B interface, as shown via the incoming message 206 and the outgoing message 208. Regardless of direction, this approach may generally be applicable to arbitrary pairs of wireless technologies which are utilized by the radios 104 embedded in the bridge 106.

Figure 3:
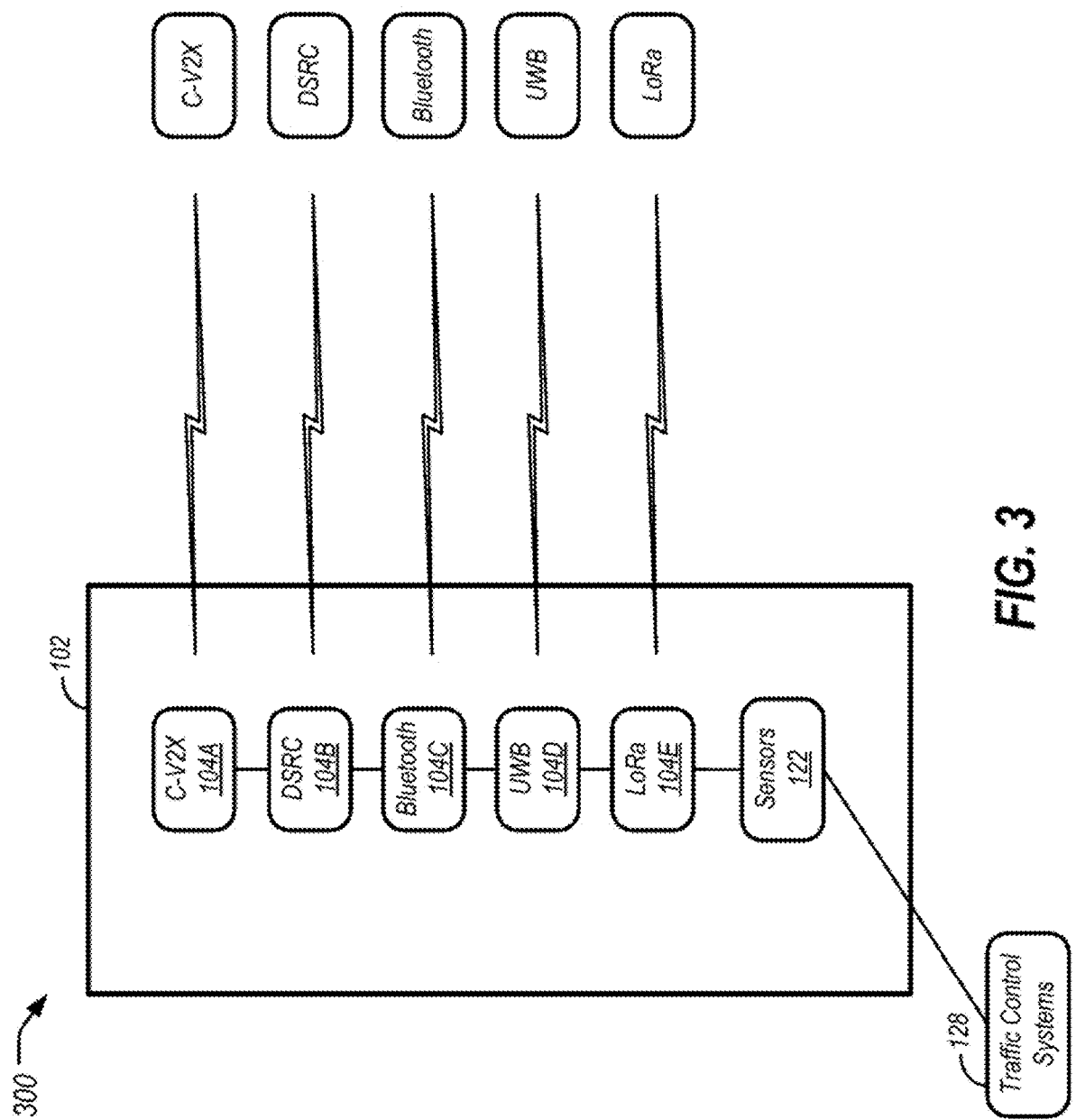
FIG. 3 illustrates an example of the RSU in wireless communication over various radio interfaces.

FIG. 3 illustrates an example 400 of the RSU 102 in wireless communication over various radio interfaces 104. As shown, the RSU 102 is in wireless communication via the C-V2X radio 104A with C-V2X equipped devices, is in wireless communication via the DSRC radio 104B with DSRC-equipped devices, is in wireless communication via the BLUETOOTH radio 104C with BLUETOOTH or BLE-equipped devices, is in wireless communication via the UWB radio 104D with UWB-equipped devices, and is in wireless communication via the LoRa radio 104E with LoRa-equipped devices. The RSU 102 is also in wired or wireless communication with the traffic control systems 128.

Figure 4:
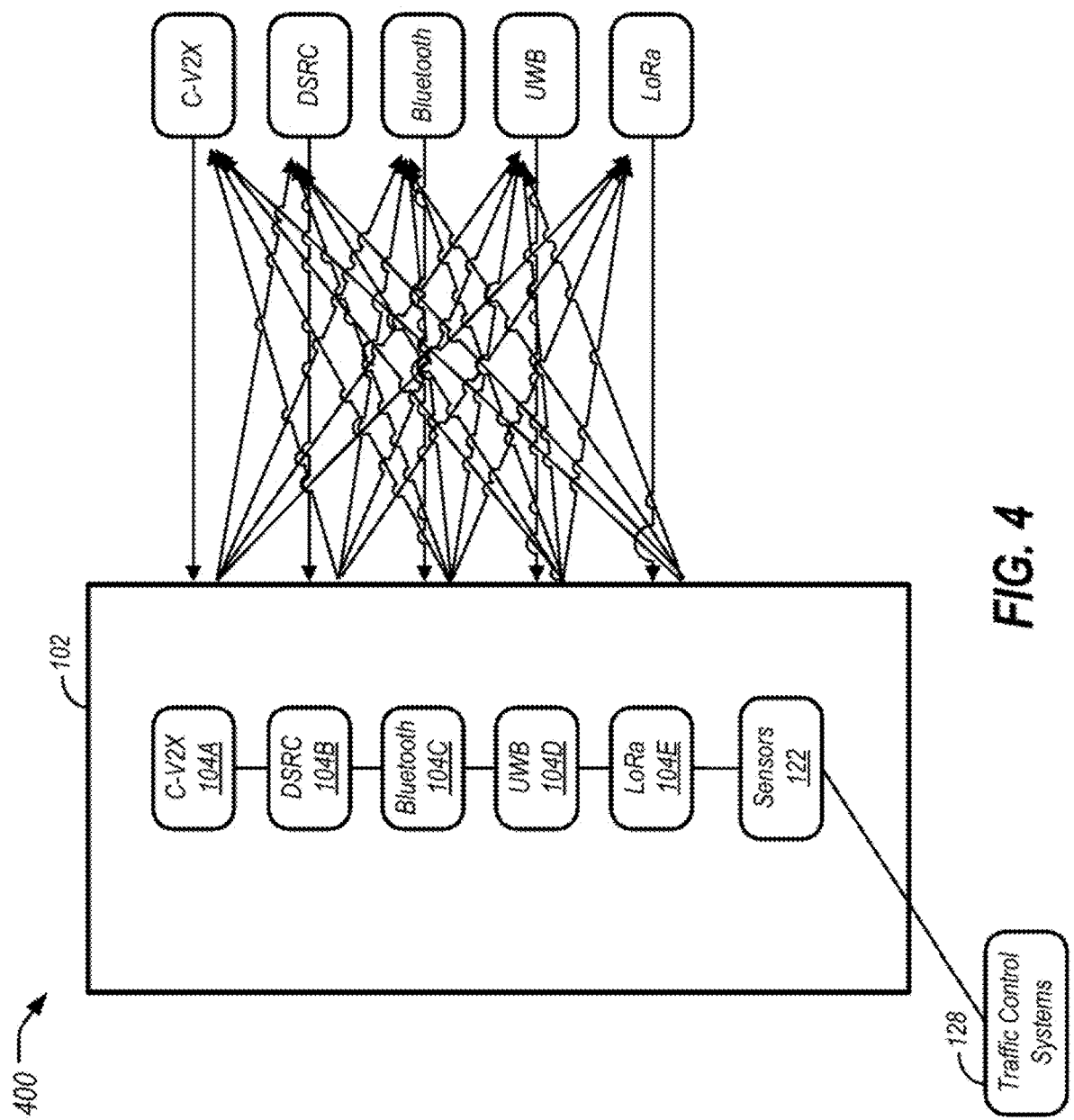
FIG. 4 illustrates an example of possible translation paths among radio interfaces available via the RSU.

FIG. 4 illustrates an example 400 of possible translation paths among radio interfaces 104 available via the RSU 102. As can be seen in the example 400, translation paths exist from each of the C-V2X radio 104A, the DSRC radio 104B, the BLUETOOTH radio 104C, the UWB radio 104D, and the LoRa radio 104E to each of one another. Accordingly, the bridge 106 allows for translation among each of the various supported protocols.

Referring back to FIG. 2, with respect to the background monitoring process, the bridge 106 may keep track of the congestion level on the C-V2X (PC5) radio 104A interface using the congestion manager 112. The translated outgoing message 204 reaching the C-V2X (PC5) radio 104A output interface may be subjected to the congestion control algorithm running by the congestion manager 112 for this interface. The congestion control algorithm monitors channel quality of service parameters and also channel congestion. Based on this monitoring, the congestion control algorithm determines a transmission probability for the translated outgoing message 204 and adjusts the transmit power accordingly on the transmission of the outgoing messages 204 for the various respective wireless technologies.

As another example, the congestion manager 112 monitoring the mobility, congestion patterns, and networks load on C-V2X (PC5) radio 104A may not detect transmissions on that interface or may not detect any transmissions in a particular target classification area where DSRC transmissions are present. If a DSRC message is received on the DSRC radio 104B interface, then the bridge 106, responsive to classification of the message, may decide not to translate and forward this message to the C-V2X (PC5) output radio 104A interface. This may be logical, for example, if the bridge 106 deems there to be no recipients for such a message.

Figure 5:
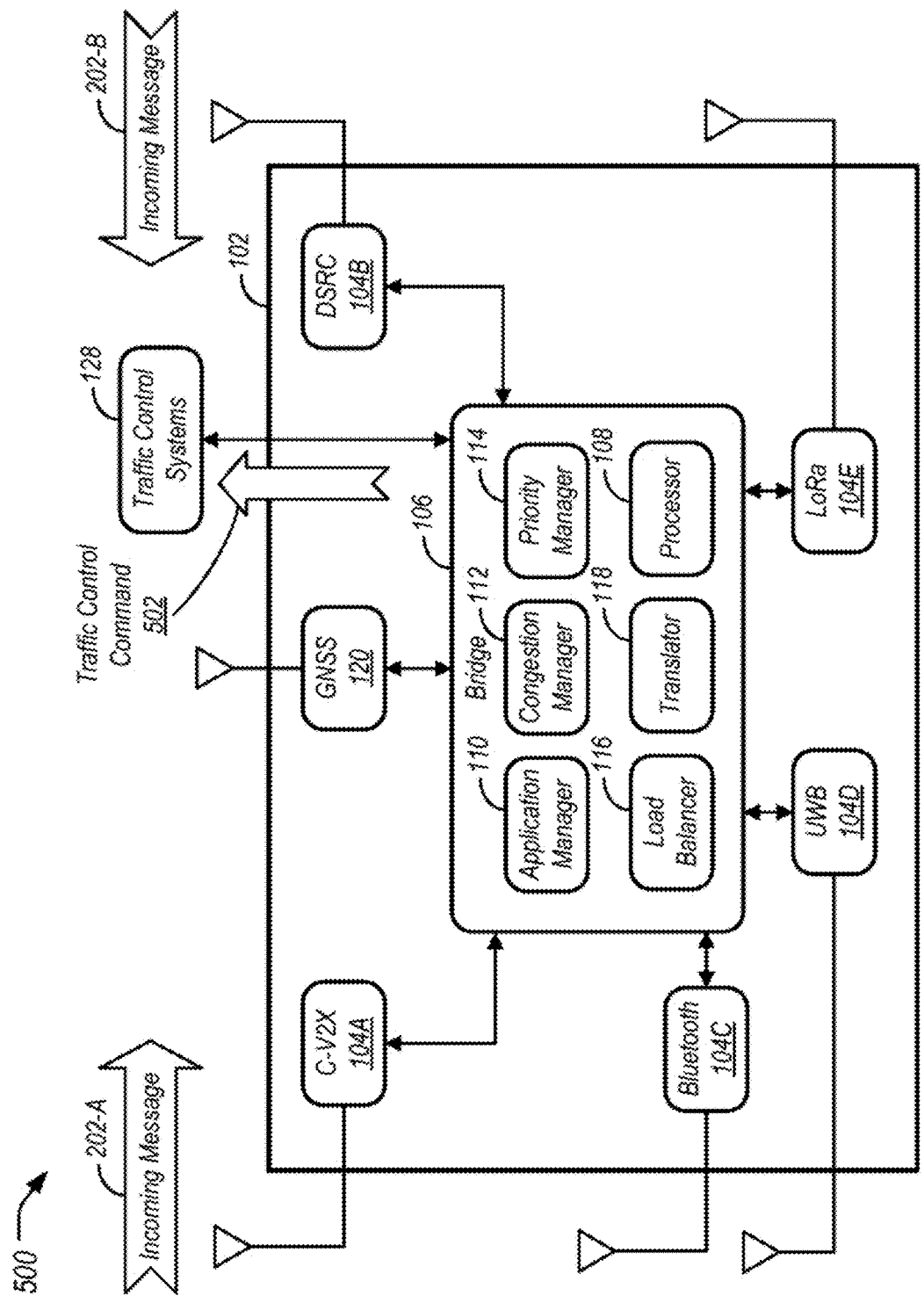
FIG. 5 illustrates an example of the RSU synchronizing incoming messages requesting action by the traffic control system.

FIG. 5 illustrates an example 500 of the RSU 102 synchronizing incoming messages 202 requesting action by the traffic control system 128. As shown, the RSU 102 in the example 500 includes multiple radio 104 interfaces. Thus, requests for accessing traffic signals may be received simultaneously or within a short timeframe on two or more input radio interfaces. As shown, an incoming message 202-A is received to the C-V2X radio interface 104A while an incoming message 202-B is also received to the DSRC radio 104B interface. The bridge 106, responsive to performing the message classification, may determine which of the multiple requests is of higher or highest priority, and may send a traffic control command 502 to the traffic control system 128 to change the status of a traffic signal or other traffic control device for higher priority message.

Subsequently, the bridge 106 may create messages for the other interfaces who were deprioritized, informing the devices listening on those interfaces that their original request was not granted. For instance, the bridge 106 may indicate to the radio 104 whose incoming message 202 was not acted upon that the request was denied. This may, in turn, be communicated back to the sender of the incoming message 202 to inform of the denial.

Figure 6:
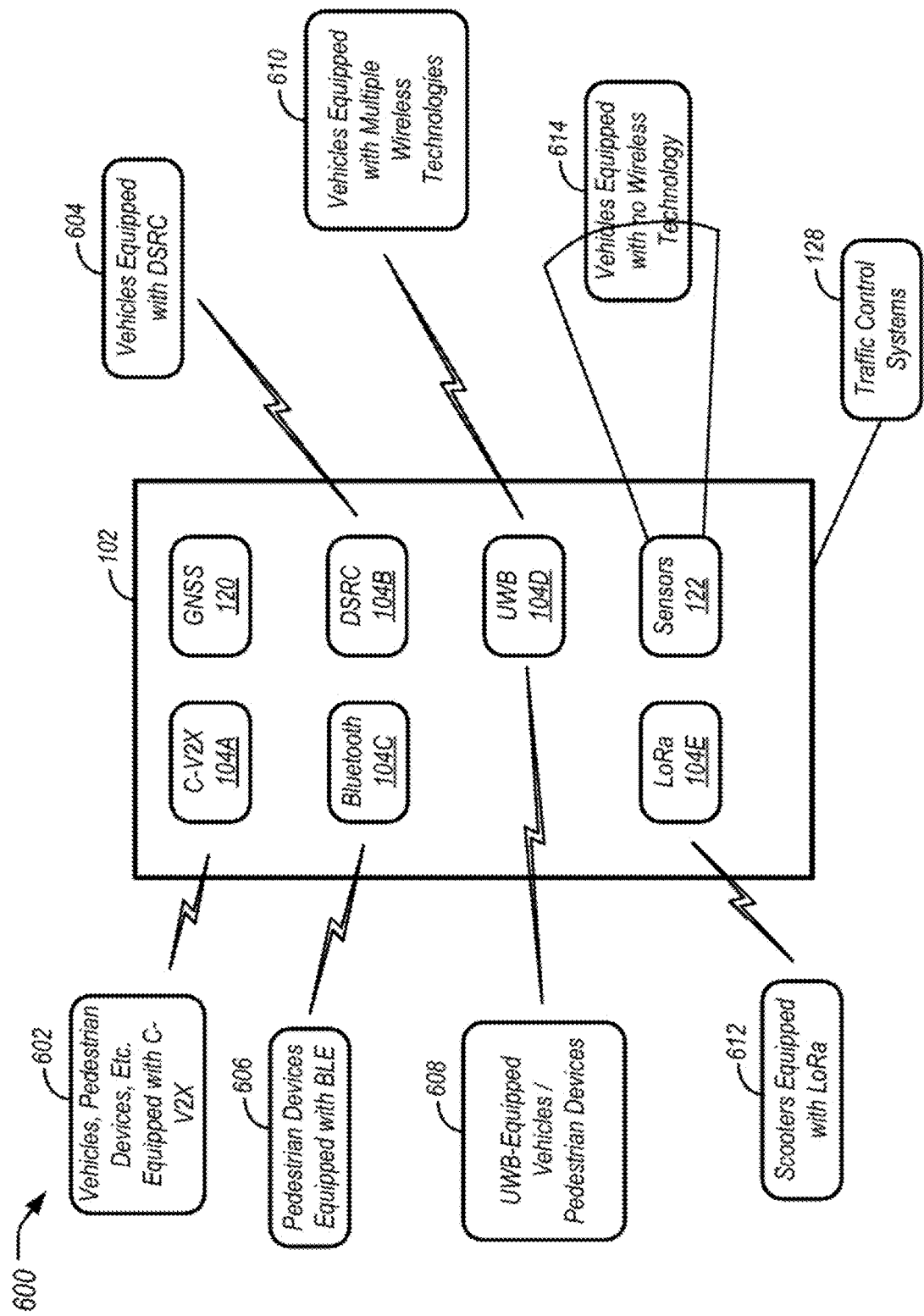
FIG. 6 illustrates an example of the RSU in communication with various devices in the context of a roadway.

FIG. 6 illustrates an example 600 of the RSU 102 in communication with various devices in the context of a roadway. For instance, the C-V2X radio interface 104A may be in communication with roadway users 126 equipped with C-V2X transceivers 602. The DSRC radio interface 104B may be in communication with vehicles or other roadway users 126 equipped with DSRC transceivers 604. The BLUETOOTH radio interface 104B may be in communication with pedestrians 124 equipped with BLE transceivers 606. The UWB radio interface 104D may be in communication with UWB-equipped vehicles or pedestrians 608, as well as with vehicles equipped with multiple wireless technologies 610. The LoRa radio interface 104E may be in communication with scooters equipped with LoRa 612. The sensors 122 may include cameras or other technologies configured to sense vehicles equipped with no wireless technologies 614, or in other examples with vehicles that are otherwise unable to wirelessly unable to communicate wirelessly with the RSU 102 (e.g., due to damage or interference).

Figure 7:
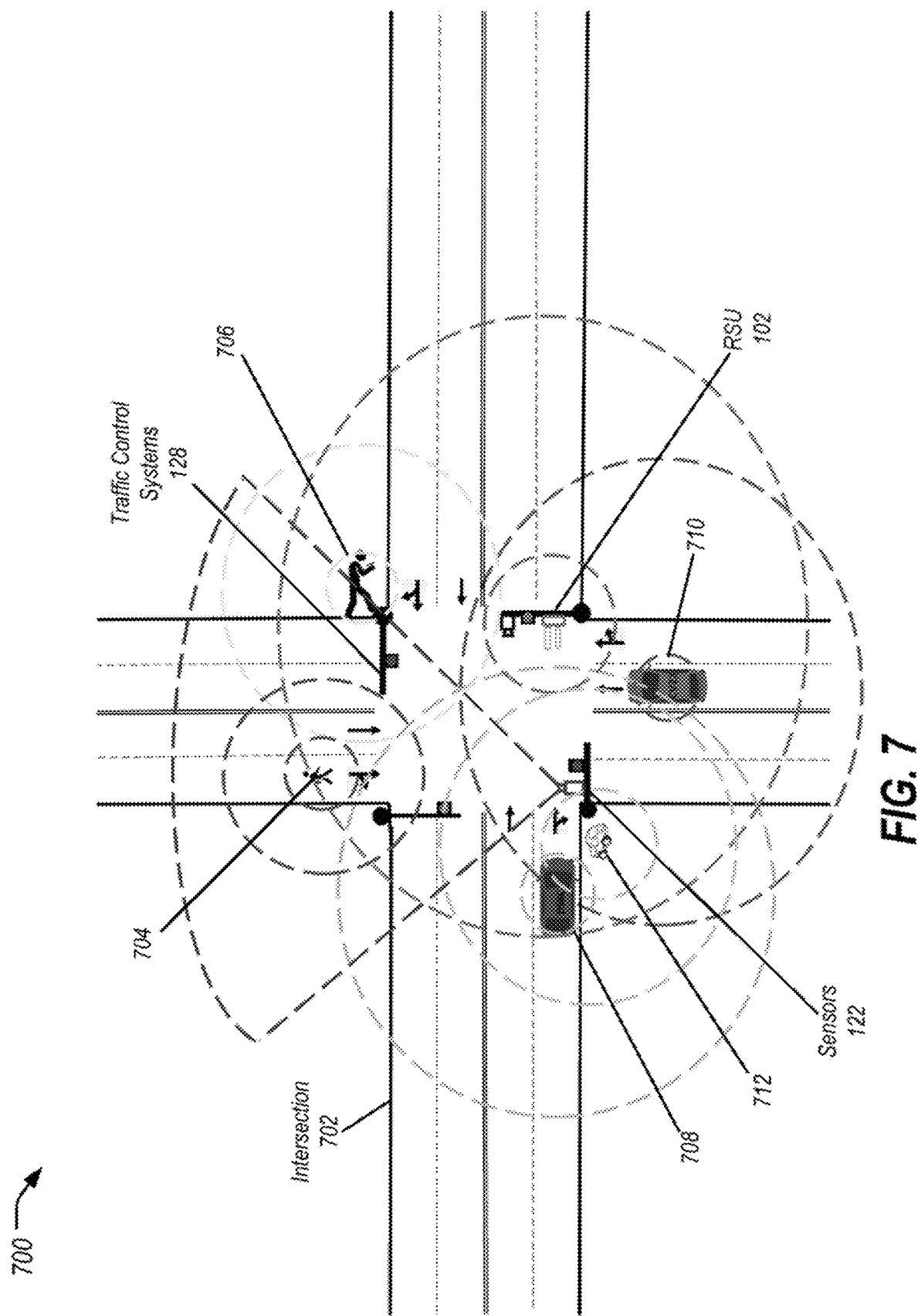
FIG. 7 illustrates an example representation of an intersection having the RSU, sensors, and traffic control systems.

FIG. 7 illustrates an example 700 representation of an intersection 702 having the RSU 102, sensors 122, and traffic control systems 128. As shown, the sensors 122 identify a pedestrian 704 crossing the intersection 702, and a pedestrian 706 waiting to cross the intersection 702. The RSU 102 also communicates with a vehicle equipped for DSRC communication 708, and a vehicle equipped for DSRC communication 710. The RSU 102 additionally communicates with a scooter 712 via LoRa.

Figure 8:
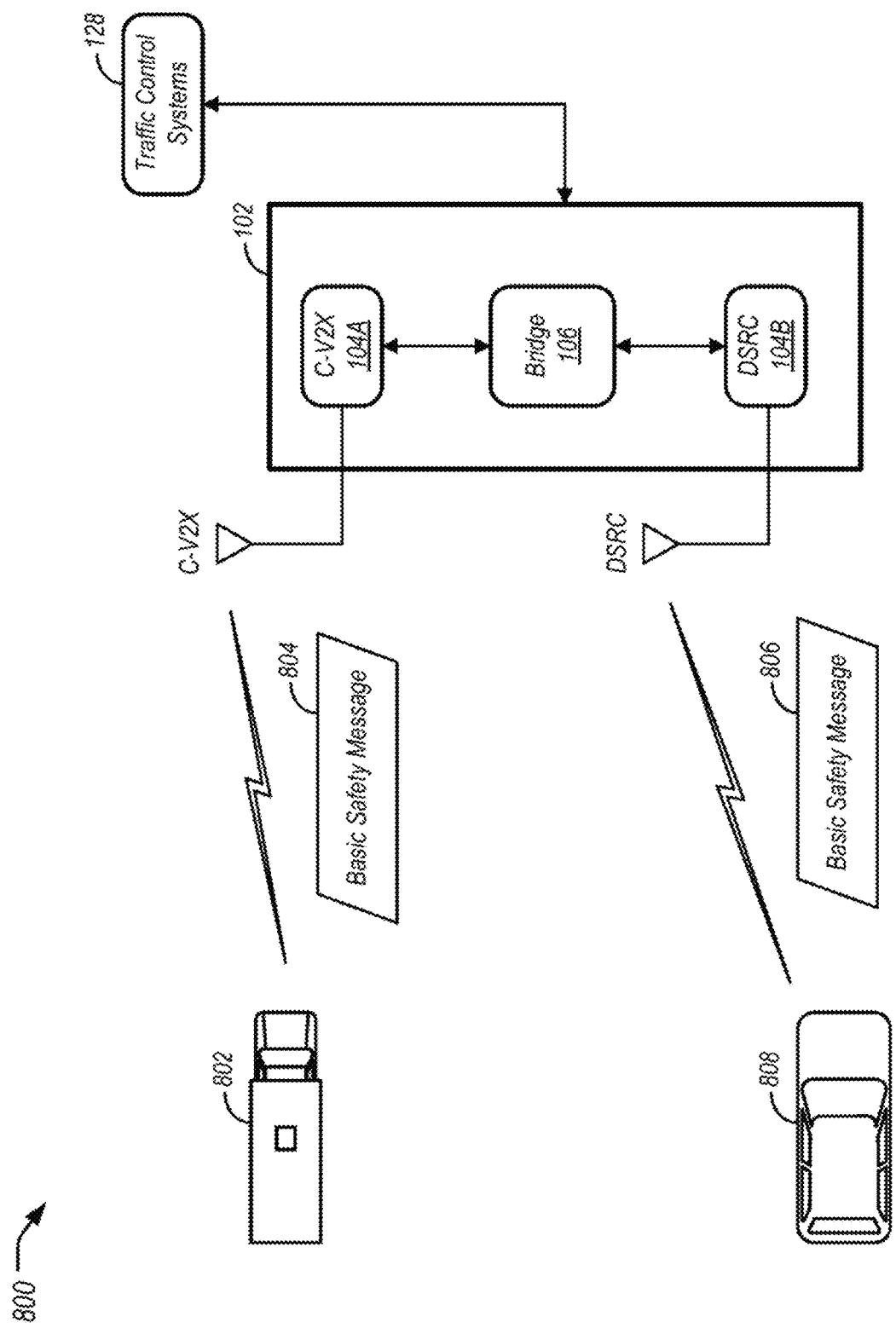
FIG. 8 illustrates an example of vehicle-to-vehicle communication interworking CV2X and DSRC using the RSU.

FIG. 8 illustrates an example 800 of vehicle-to-vehicle (V2V) communication interworking CV2X and DSRC using the RSU 102. Thus, the example 800 illustrates a scenario in terms of V2V communication between CV2X-equipped-vehicles 802 and DSRC-equipped-vehicles 804. Such a scenario may benefit the ITS safety applications in that different V2X technologies are made to be interoperable by way of the functionality of the bridge 106 of the RSU 102.

In general, CV2X and DSRC messaging uses the same ITS standard protocols such as SAE-J2735_201603, IEEE-1609.2, IEEE-1609.3, IEEE-1609.12 for transmission and reception of the messages. These messages are defined in the SAE-J2735_201603 standard protocol. In an example, one of the messages from the SAE-J2735_201603 is a basic safety message (BSM). The BSM may contain a set of core data elements vehicle size, position, speed, heading acceleration, brake system status). As shown, a vehicle 802 configured to transmit CV2X is transmitting a BSM 804 via CV2X. The vehicle 802 may transmit such a message approximately ten times per second. Regarding CV2X Protocols, CV2X-PC5 uses LTE-V2X (3GPP Rel) for Physical and MAC Layer, and the CV2X equipped vehicle 802 uses the SAE J3161 for the on-board system requirements.

The BSM 804 may be received by the C-V2X transceiver 104A of the RSU 102 and may be provided to the bridge 106, The bridge 106 uses the processor 108, application manager 110, congestion manager 112, priority manager 114, load balancer 116, translator 118, to translate the BSM 804 into a BSM 806 to be transmitted using the DSRC radio 104C of the RSU 102. For instance, the RSU 102 may monitors the mobility, the congestion pattern status, and the network load on both DSRC and C-V2X (PC5) interfaces to aid in for decision making. The RSU 102 may decode the CV2X message to classify the target and the priority levels using the processor 108. According to this classification the RSU 102 assigns priority at the CV2X (PC5) interface using the priority manager 114, translates the message into a format acceptable for DSRC communication using the translator 118, and sends the translated message for transmission to the output interface (here DSRC). The congestion manager 112 may also keep track of the congestion level on the output interface to subject output messages to the congestion control algorithm for the output interface. The BSM 806 may accordingly be received by a vehicle 808 configured to receive messages via DSRC. Regarding DSRC protocols, DSRC uses IEEE 802.11p, 1609.4 for Physical and MAC Layer, and the DSRC equipped vehicle 808 uses the SAE J2945/1 for the on-board system requirements.

Figure 9:
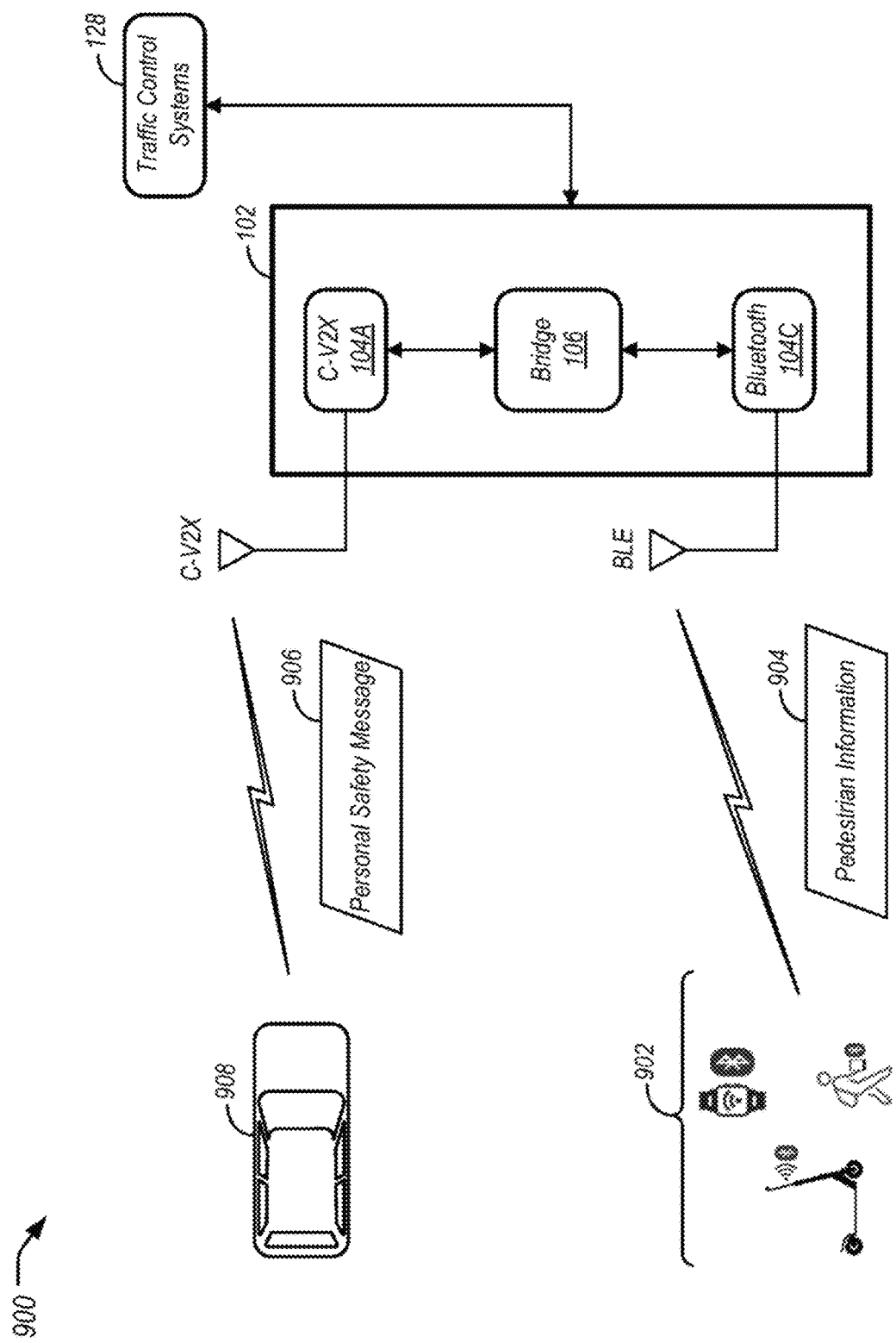
FIG. 9 illustrates an example of vehicle-to-pedestrian communication interworking CV2X and BLE using the RSU.

FIG. 9 illustrates an example of vehicle-to-pedestrian communication interworking CV2X and BLE using the RSU 102. Notably, CV2X and BLE uses different standard protocols. For example, CV2X-PC5 uses LTE-V2X (3GPP Rel) for Physical and MAC Layers, and a CV2X equipped vehicle 908 uses the SAE J3161 for the on-board system requirements and ITS standards for other OSI layers. ITS standards such as SAE-J2735_2016 IEEE-1609.2, IEEE-1609.3, IEEE-1609.1.2 may be used for the transmission and reception of the messages. Regarding BLE protocols, BLE uses IEEE 802.15.1, and BLE uses Bluetooth SIG Standards for other OSI layers.

As shown, the Bluetooth transceiver of the pedestrian 902 sends pedestrian information 904 using BLE message attributes (such as identifiers, descriptors, characteristics, services, etc.). Notably, this transceiver of the pedestrian 902 may be a transceiver of a mobile device of the pedestrian 902 (e.g., a smartphone, a smart watch, a tablet, etc.) or a transceiver of a mobility device of the pedestrian 902 (e.g., a scooter, a bicycle, etc.). This pedestrian information 904 may be received by the Bluetooth transceiver 104C of the RSU 102 and may be provided from the transceiver 104C to the bridge 106.

The translator 118 of the bridge 106 may translate the pedestrian information 904 of the BLE messages into a CV2X-ITS message. In an example, the information of the BEE message may be translated into a personal safety message (PSM) 906. Details of the PSM 906 format are defined in SAE-J2735_201603. The PSM 906 may be transmitted from the C-V2X transceiver 104A of the RSU 102 to be received by a vehicle 908 equipped with CV2X capabilities. Thus, the vehicle 908 may be able to receive information over CV2X about pedestrians 902 who are not capable of communicating over CV2X.

More generally, the bridge 106 again monitors the mobility, the congestion pattern status, and the network load on the radio interfaces of the RSU 102, The bridge 106 decodes the incoming Bluetooth-BLE beacon messages to classify the target and the priority levels, where according to this classification the bridge 106 assigns priority of outgoing messages 204 at the multiple output radio interfaces and translates the beacon message information to the respective message formats acceptable for multiple radio communications selected as output radio interfaces. The bridge 106 then causes the translated beacon message to be transmitted over the output radio interfaces. Additionally, the bridge 106 may monitor to track the congestion level on each of the radio interfaces. The translated message reaching the multiple radio output interfaces may accordingly be subjected to the congestion control algorithm running in those particular output interfaces. Or, if no messaging is detected over a particular protocol (e.g., no DSRC traffic), no output message may be required to be provided by the RSU 102 over that protocol.

Figure 10:
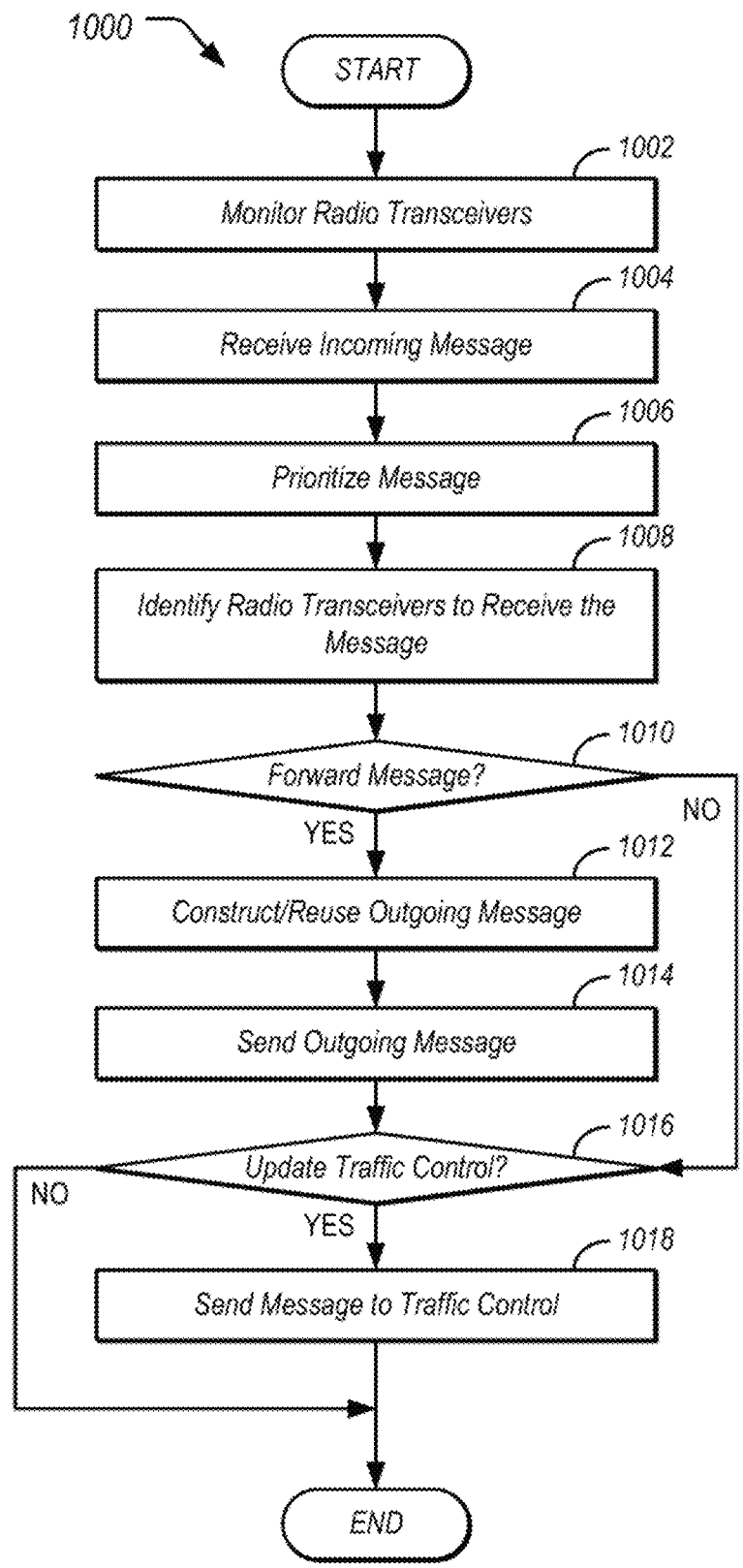
FIG. 10 illustrates an example process for the translation of messages among radio interfaces available to the RSU.

FIG. 10 illustrates an example process 1000 for the translation of messages among radio interfaces 104 available to the RSU 102. In an example, the process 1000 may be performed by the processor 108 of the bridge 106 of the RSV 102 in the context of the system 100.

At operation 1002, the bridge 106 monitors radio transmissions. In an example, the congestion manager 112 monitors transmissions from each of the radio transceivers 104. The congestion manager 112 may do so to identify whether there are message recipients on each of the available protocols supported by the radio transceivers 104. The congestion manager 112 may also do so to direct a radio transceiver 104 that is congested to perform operations to mitigate the congestion.

At 1004, the bridge 106 receives an incoming message 202. In an example, the incoming message 202 may be received to one of the radio transceivers 104. This incoming message 202 may be directed to the processor 108 of the bridge 106 for analysis.

The bridge 106 prioritizes the incoming message 202 at 1006. In an example, the priority manager 114 determines whether other incoming message 202 were received, and whether the priority of the current incoming message 202 is greater or lesser than that of the other incoming messages 202, if any.

At 1008, the bridge 106 identifies radio transceivers to receive the message. In an example, the bridge 106 may determine, based on the monitoring of the radio transmissions at 802, that there are possible message recipients on one or more of the protocols supported by the radio transmissions at 802. For instance, the bridge 106 may identify recent transmissions on certain of the protocols but not on other of the protocols. At operation 1010, the bridge 106 determines whether to forward the message. If other protocols are identified at operation 1008, control passes to operation 1012. Otherwise, the process continues to operation 1016.

At 1012, the bridge 106 constructs an outgoing message 204. In an example, the bridge 106 utilizes the translator 118 to create packets or other formats of message that include the information in conformance with the requirements of the protocol being translated to. In another example, for similar protocols, the bridge 106 may reuse the incoming message 202 as a base for the outgoing message 204. The bridge 106 sends the outgoing message at 814. In an example, the bridge 106 directs the radio transceiver 104 corresponding to the output protocol to send the outgoing message 204.

At operation 1016, the bridge 106 determines whether to update the traffic control systems 128. In an example, the incoming message 202 may specify that there is a pedestrian 124 waiting to cross the roadway. In another example, the incoming message 202 may specify that there is an incoming emergency vehicle that wishes to have priority to travel through an intersection. If a message indicating to update the traffic control systems 128 is received, control passes to operation 818. The bridge 106 sends a message to update the traffic control systems 128 at 1018. This message may specify, as some examples, to change traffic controls to allow traffic going down a specified one path, or to allow pedestrians 124 to cross. After operation 818, or if no message is required at operation 816, the process 1000 ends.

While the process 1000 is described in a linear manner, it should be noted that the process 1000 may be performed continuously, or in a loop, or responsive to the receipt of messages such as noted at operation 1004. In sum, by performing smart bridging of various wireless protocols not originally designed to be interoperable additional ITS applications may be performed that might otherwise not be feasible. In particular, efficient methods and apparatus to bridge ITS networks supported by distinct wireless technologies may be performed by the improved RSU 102, which may be used to leverage input from various protocols and technologies to enhance ITS applications.

Computing devices described herein generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, JAVA™, C, C++, C #, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing, Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A road-side unit comprising:
a first transceiver configured to communicate using a first vehicle-to-infrastructure protocol;
a second transceiver configured to communicate using a second vehicle-to-infrastructure protocol, the first vehicle-to-infrastructure protocol and the second vehicle-to-infrastructure protocol being incompatible with one another;
a third transceiver; and
a processor programmed to
monitor transmissions from the first and second transceivers,
receive an incoming message sent to the processor from the first transceiver, the incoming message being designated for distribution to roadway participants,
identify based on the monitored transmissions whether the second transceiver is in communication with devices of roadway participants available to receive outgoing messages,
if so, construct an outgoing message based on the incoming message and send the outgoing message via the second transceiver,
monitor transmissions from the first, second, and third transceivers;
identify, based on the transmissions, whether the third transceivers is in communication with one or more devices that receive outgoing messages from the third of the plurality of transceivers, and
if so, construct a second outgoing message based on the incoming message and send the second outgoing message via the third of the plurality of transceivers.

2. The road-side unit of claim 1, wherein the incoming message is received from a mobile device of a roadway participant, and processor is further programmed to:
responsive to receipt of the incoming message to the first transceiver, identify a threat level of the roadway participant to other of the roadway participants according to distance of the roadway participant from a roadway; and
prioritize sending the outgoing message as compared to other messages according to the threat level.

3. The road-side unit of claim 1, wherein the first vehicle-to-infrastructure protocol is Cellular Vehicle-to-Everything (CV2X) and the second vehicle-to-infrastructure protocol is Dedicated Short Range Communications (DSRC).

4. The road-side unit of claim 1, wherein the first vehicle-to-infrastructure protocol is BLUETOOTH.

5. The road-side unit of claim 1, wherein the processor is further programmed to:
receive a second incoming message from the second transceiver, concurrent to reception of the incoming message from the first transceiver;
construct a second outgoing message based on the second incoming message; and
send the second outgoing message via the first transceiver.

6. The road-side unit of claim 1, wherein the processor is further programmed to:
identify based on the incoming message that a change in status of a traffic control is requested; and
send a message to the traffic control to change the status of the traffic control.

7. A method comprising:
responsive to receipt of a first incoming message indicating a status of a first roadway participant to a first of a plurality of transceivers of a road-side unit, identifying a priority of providing information to other roadway participants about the first roadway participant according to the status;
receiving a second incoming message to a second of the plurality of transceivers;
prioritizing sending a first outgoing message including information indicating the status of the first roadway participant over other messages affiliated with lower priority statuses at least until the status of the first roadway participant changes;

monitoring transmissions from each of the plurality of transceivers;

identifying, based on the transmissions, whether a third transceiver of the plurality of transceivers is in communication with one or more devices that receive outgoing messages from the third transceiver, and if so, construct a second outgoing message based on the incoming message and send the second outgoing message via the third transceiver.

8. The method of claim 7, wherein the first of a plurality of transceivers is configured to send and receive messages according to one of a set of protocols including: Cellular Vehicle-to-Everything (CV2X), Dedicated Short Range Communications (DSRC), Wi-Fi, BLUETOOTH, or Long Range Low Power Wide Area Networks (LoRaWAN).

9. The method of claim 8, wherein the second of the plurality of transceivers is configured to send and receive messages according to a different one of the set of protocols.

10. The method of claim 7, further comprising:

receiving the second incoming message from the second of the plurality of transceivers, concurrent to reception of the first incoming message from the first of the plurality of transceivers;

constructing a second outgoing message based on the second incoming message; and sending the second outgoing message via the first of the plurality of transceivers.

11. The method of claim 7, further comprising:

identifying based on the first incoming message that a change in status of a traffic control is requested; and sending a message to the traffic control to change the status of the traffic control.

12. A non-transitory computer readable medium comprising instructions that, when executed by a processor of a road-side unit, cause the road-side unit to:

responsive to receipt of a first incoming message indicating a status of a first roadway participant to a first of a plurality of transceivers of a road-side unit, identifying a priority of providing information to other roadway participants about the first roadway participant according to the status;

receive a second incoming message to a second of the plurality of transceivers; and prioritize sending a first outgoing message including information indicating the status of the first roadway participant as compared to other messages according to the priority;

monitor transmissions from each of the plurality of transceivers;

identify, based on the transmissions, whether a third of the plurality of transceivers is in communication with one or more devices that receive outgoing messages from the third of the plurality of transceivers; and if so, construct a second outgoing message based on the incoming message and send the second outgoing message via the third of the plurality of transceivers.

13. The medium of claim 12, wherein the first of the plurality of transceivers is configured to send and receive messages according to one of a set of protocols including: Cellular Vehicle-to-Everything (CV2X), Dedicated Short Range Communications (DSRC), Wi-Fi, BLUETOOTH, or Long Range Low Power Wide Area Networks (LoRaWAN).

14. The medium of claim 13, wherein the second of the plurality of transceivers is configured to send and receive messages according to a different one of the set of protocols than the first of the plurality of transceivers.

15. The medium of claim 12, further comprising instructions that, when executed by the processor of the road-side unit, cause the road-side unit to:

receive a second incoming message from the second of the plurality of transceivers, concurrent to reception of the first incoming message from the first of the plurality of transceivers;

construct a second outgoing message based on the second incoming message; and send the second outgoing message via the first of the plurality of transceivers.

16. The medium of claim 12, further comprising instructions that, when executed by the processor of the road-side unit, cause the road-side unit to:

identify based on the incoming message that a change in status of a traffic control is requested; and send a message to the traffic control to change the status of the traffic control.

* * * * *